United States Patent [19]

Wemyss

[11] 4,030,357
[45] June 21, 1977

[54] METERING OF FLUID FLOWS

[75] Inventor: William Alexander Wemyss, Northwood, England

[73] Assignee: Litre Meter Limited, Northwood, England

[22] Filed: Aug. 3, 1976

[21] Appl. No.: 711,050

[30] Foreign Application Priority Data

Aug. 5, 1975 United Kingdom ............ 32668/75

[52] U.S. Cl. .................................. 73/202; 73/229; 415/203
[51] Int. Cl.² ...................... G01F 1/075; G01F 5/00
[58] Field of Search .............. 73/202, 229; 415/203

[56] References Cited

UNITED STATES PATENTS 2,723,563  11/1955  Stevenson .......................... 73/202
3,866,469   2/1975  Wemyss ............................. 73/229

Primary Examiner—James J. Gill
Attorney, Agent, or Firm—Allison C. Collard

[57] ABSTRACT

A rotary fluid flowmeter device comprising a casing enclosing a chamber bounded partly by a fluid-tight but magnetically permeable partition, said chamber having an inlet and an outlet for the fluid of which the flow is to be metered, and a rotor having radially-directed, axially-extending blades being borne for rotation within the chamber, wherein in operation fluid entering the chamber through the inlet is directed towards and impinges upon the rotor blades to cause rotation of the rotor, and wherein the casing houses an electronic sensing circuit on the far side of the partition from said chamber, the circuit being adapted to produce an electronic pulse train the rate of which represents the rate of rotation of the rotor.

4 Claims, 5 Drawing Figures

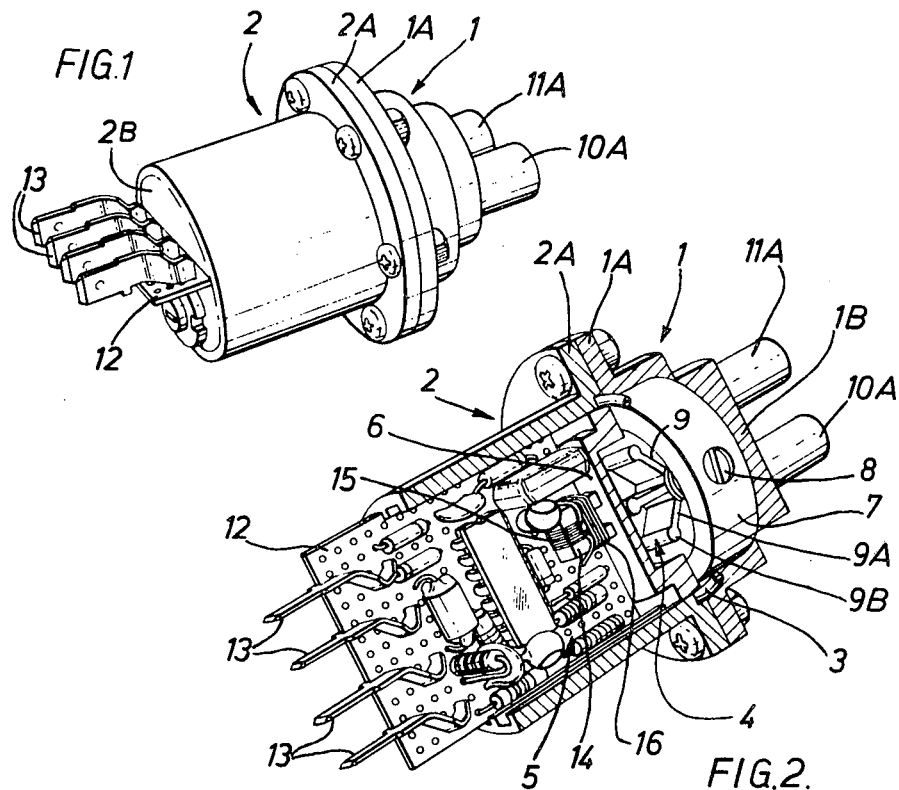
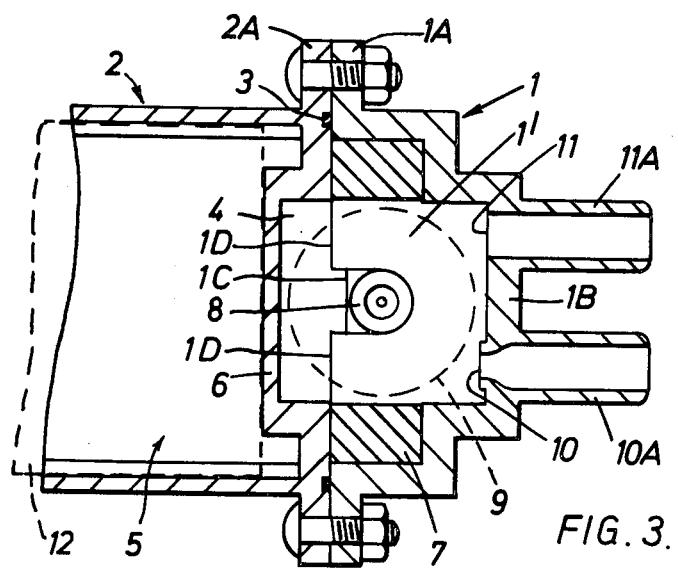

METERING OF FLUID FLOWS

BACKGROUND OF THE INVENTION

The present invention relates to fluid flowmeters for the metering of fluid flows, and in particular for the metering of liquid flows.

SUMMARY

In a first aspect the invention seeks to provide for the metering of relatively large flows using a flowmeter device which is, however, capable of handling only relatively small flows. Thus, in this aspect the invention proposes fluid flow-metering apparatus for use in the metering of fluid flows comprising a conduit within which the fluid can flow, a fluid flowmeter device connected in parallel with said conduit, the fluid inlet to said flowmeter device communicating with the interior of said conduit at a first station and the fluid outlet from said flowmeter device communicating with the interior of said conduit at a second station downstream of the first in the sense of the flow of fluid through the conduit, and a restriction within the length of the conduit between the first and second stations, the impedance to fluid flow through the conduit between said stations being so related to the impedance to fluid flow through the flowmeter device between said stations that a known major proportion of the fluid flow incident to the first station is directed to the second station through the conduit and a known minor proportion of the fluid flow incident to the first station is directed to the second station through the flowmeter device.

For an arrangement as defined above, in which the restriction is for example an orifice plate, Venturi or flow nozzle, the position of the first and second stations can be selected so that the presence drop experienced between the two stations is substantially proportional to the square of the rate of flow between the stations, (or in other words for a 10:1 change in the rate of flow a 100:1 change in the pressure drop is experienced). Thus, if the signal which emanates from the flowmeter device, whatever form this may take is substantially proportional to the square root of the pressure drop between the two stations over a certain range (or in other words for a 100:1 change in the pressure drop the value of the signal changes by 10:1), then the signal from the flowmeter device will be directly proportional to the total rate of flow between the two stations over that range.

Preferably, the flowmeter device is of the type which comprises a chamber having an inlet and outlet for the fluid of which the flow is to be metered and a rotor having radially directed, axially-extending blades borne for rotation within the chamber, and wherein in operation fluid entering the chamber through the inlet is directed towards and impinges upon the rotor blades to cause rotation of the rotor.

A specific embodiment of this type of flowmeter device is more particularly described below with reference to the accompanying drawings. Tests have shown that this device satisfies the desired relationship described above between signal value (in this case expressed as the rate of rotation of the rotor) and pressure drop over a very great range of flow rates, and that when used in parallel with an orifice plate the rate of rotation of the rotor in this flowmeter device can be substantially proportional to the total rate of flow through the parallel arrangement over a range of total flowrates greater than 60:1 (that is, the maximum measurable rate of flow is sixty times greater than the minimum measurable rate of flow).

In a second aspect the invention resides in a rotary fluid flowmeter device comprising a casing enclosing a chamber bounded partly by a fluid-tight but magnetically permeable partition, said chamber having an inlet and an outlet for the fluid of which the flow is to be metered, and a rotor having radially-directed, axially-extending blades being borne for rotation within the chamber, wherein in operation fluid entering the chamber through the inlet is directed towards and impinges upon the rotor blades to cause rotation of the rotor, and wherein the casing houses an electronic sensing circuit on the far side of the partition from said chamber, the circuit being adapted to produce an electronic pulse train the rate of which represents the rate of rotation of the rotor.

To this end one or more of the rotor blades may carry a piece of ferrite or the like at or near its tip which cyclically passes in proximity to said partition as the rotor rotates, thereby cyclically modifying the output of an inductive sensor located in proximity to said partition, electrical circuitry being provided for deriving the requisite pulse train from said output.

In a third aspect, the invention resides in a fluid flowmeter device comprising a casing in which there is formed a cylindrical chamber which is closed at one end by a first end wall containing an inlet and an outlet for the fluid, a separately made ring of metal fitted non-rotatably in said chamber, said ring supporting two bearings at diametrically opposite positions in said ring, said ring having a cylindrical outer face and a cylindrical inner face and two diametrically opposite bores, the bearings being received within said bores, the cylindrical outer face of said ring fitting in said cylindrical chamber, a rotor mounted on said bearings so that the rotor axis is perpendicular to and intersects the axis of said ring, said rotor including radially-directed, axially-extending blades which are each substantially rectangular as seen in a direction perpendicular to the respective blade, one or more inductively detectable elements mounted in the tip or tips of one or more respective blades of the rotor, and two or more members made separately from said ring and partly filling the interior of said ring, each of said two or more members having a part-cylindrical outer face interfitting with a respective part of the cylindrical inner face of said ring, and a planar inner face facing the rotor and perpendicular to the axis of the rotor, the casing including a second end wall which closes off the other end of the chamber and a coil in the vicinity of the second end wall, the coil being sealed off fluid-tightly from the chamber for sensing rotation of the rotor by sensing passage past the vicinity of the coil of said elements.

In a fourth aspect, the invention resides in fluid flow-metering apparatus comprising a fluid flowmeter device according to the third aspect of the invention and a conduit, wherein said inlet and said outlet communicate with said conduit, the flowmeter device being adapted to produce a pressure difference due to fluid flow along said conduit between said inlet and said outlet such that a minor proportion of the fluid flowing along said conduit flows into and out of said chamber through said inlet and outlet while a major proportion of the fluid flowing along said conduit bypasses said chamber, the ratio between said minor and major proportions being substantially fixed over a range of rates of flow of a given fluid along said conduit.

BRIEF DESCRIPTION OF THE DRAWINGS

FIG. 1 is a pictorial view of a flowmeter device embodying the second and third aspects of the invention and embodied in apparatus embodying the first and fourth aspects of the invention;

FIG. 2 is a pictorial view of the flowmeter device of FIG. 1, partially cut-away to reveal its internal components;

FIG. 3 shows the flowmeter device of FIGS. 1 and 2 in cross-section without the rotor, the volume swept by the rotor being indicated in dashed line;

DESCRIPTION OF THE PREFERRED EMBODIMENT

Figure 4:
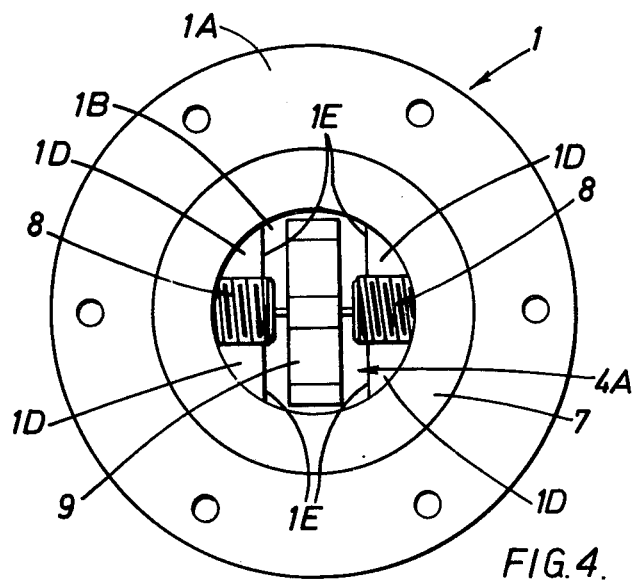
FIG. 4 is an end view of the interior of casing element 1 of the flowmeter device of FIGS. 1 to 3, with the rotor in place.

Referring to FIGS. 1 to 4, the flowmeter device comprises a casing formed by molded plastics elements 1 and 2, bolted together around respective flanges 1A and 2A and sealed by an elastomeric O-ring 3. The end of element 2 remote from element 1 is closed by a cap 2B. Within the casing are defined two chambers 4 and 5, separated by a fluid-tight but magnetically permeable partition 6, the partition being a portion of element 2. The chamber 4 is cylindrical and is closed at one end by the partition 6 and closed at the opposite end by an end wall 1B.

Housed within chamber 4 and located in an annular recess defined between casing elements 1 and 2 is a stainless steel ring 7. The ring 7 is provided with a pair of diametrically opposite, radial, threaded bores within which a pair of stainless steel bearing members 8 having jewelled bearing cups are threadedly engaged, and journalled between bearing members 8 is a rotor 9. The rotor is thus borne with its axis perpendicular to and intersecting that of the ring 7. The ring 7 can be readily fabricated on a lathe, since it has simply a cylindrical outer face, a cylindrical inner face, flat end faces and the two threaded bores for the bearings 8. The rotor 9 comprises six radially-directed, axially extending blades 9A each terminating in a somewhat bulbous tip 9B, in one or more of which is embedded a small rod of ferrite. As shown in FIGS. 2 and 4, each rotor blade 9A is substantially rectangular as seen in a direction perpendicular to the respective blade (i.e. in a direction along a tangent to the dotted circle in FIG. 3 with the respective blade perpendicular to, and touching the tangent). Hence, the volume swept by the rotor is like a round disc, the diameter of which is over three times its axial length, as can be seen from comparing FIGS. 3 and 4, Casing element 1 is molded to have two members 1'
1' posts"4. 1' partly fill 1' 1'
(FIG. 3) one on each side of the rotor. Each member 1'has a U-shaped cutout 10 around a respective one of the bearing members 8, to define two "psots;38 1D each having a shape of a quandrant of a circle as viewed in FIG. 4.. The two members 1'partlyfill the interior of the ring 7. The part-cylindrical outer fce of each member 1'interfits closely with a respective part of the cylindrical inner face of the ring 7, whilst a planar inner face 1E of each members 1'faces the rotor 9 and is perpendicular to the axis of the rotor 9, with the result that the free space 4A within which the rotor 9 rotates is approximately cuboid, with the planes of its largest sides perpendicular to the axis of the rotor 9.

Formed in the end wall 1B of element 1 are inlet and outlet ports 10 and 11 for the fluid of which the flow is to be metered, these ports communicating with short inlet and outlet conduits 10A and 11A respectively, the conduits being formed integrally with element 1. The rotor 9 and inlet port 10 are so positioned that fluid emerging from the inlet port is directed towards and impinges upon the rotor blades 9A adjacent to their bulbous tips 9B and in direction substantially tangential to a circumference of the rotor, to cause rotation of the rotor, the fluid subsequently leaving the flowmeter via outlet port 11. In order to change the size of inlet port 10, and thereby adapt the flowmeter to different ranges of flowrates, all that is required is to remove casing element 1 and replace it with another similar element embodying an inlet port of the required size. The casing elements 1 and 2 and rotor 9 may be made from any suitable material, the choice of which will depend to an extend upon the nature of the fluid to be metered, glass-reinforced nylon, polypropylene and stainless steel being suggested for general usage.

Housed within compartment 5 of the illustrated flowmeter is an electronic sensing circuit adapted to produce an electronic pulse train the rate of which represents the rate of rotation of rotor 9. The sensing circuit is mounted upon a board 12 held in grooves within casing element 2 and which extends out of compartment 5 through a slot in cap 2B. Terminals 13 are provided for the supply of energizing current to, and for the output from, the sensing circuit. The circuit comprises a U-shaped core 14 located in proximity to partition 6 with a first coil 15 wound around the base of the U and a second coil 16 wound around the two legs of the U perpendicular to, but not intersecting, the first. The coil 15 is energized by an oscillator at, say 50 kHz, accordingly inducing an oscillating current in coil 16. As the rotor 9 rotates the ferrite embedded in the blade tip(s) 9B passes in proximity to the other side of partition 6, thereby cyclically modifying the inductive coupling between the two coils, with a resultant variation in the current induced in coil 16. The output from this coil is first rectified and then fed to a pair of cascade-connected operational amplifiers, the first of which acts as a d.c. amplifier and the second as a Schmitt trigger, to transform the varying output from the d.c. amplifier into a sharply defined pulse train, the rate of which will represent the rate of rotation of the rotor.

The output from the flowmeter device may thus be in the form of the said pulse train, to be fed e.g. to an external counter. Alternatively a third operational amplifier may be provided in the sensing circuit for integrating the pulse train and supplying a signal to an external meter for the direct display of flowrate. A further operational amplifier is provided for regulating the power supply to the sensing circuit.

Tests with water flows have shown that for flowmeter devices substantially as illustrated in FIGS. 1 to 4, the relationship between the rate of rotation of the rotor and the rate of fluid flow through the flowmeter device is linear over a very useful range of flowrates, in some versions a range of high as 200:1. Such flowmeter devices are also amenable to the metering of very small flows; a flowmeter device constructed with a rotor chamber with its largest sides approximately 2 cms square is able to accurately measure flows as small as 10ccs per minute. Nevertheless, when fitted with a larger inlet port same flowmeter device is also able to accurately measure flows of up to 20 liter/minute.

Figure 5:
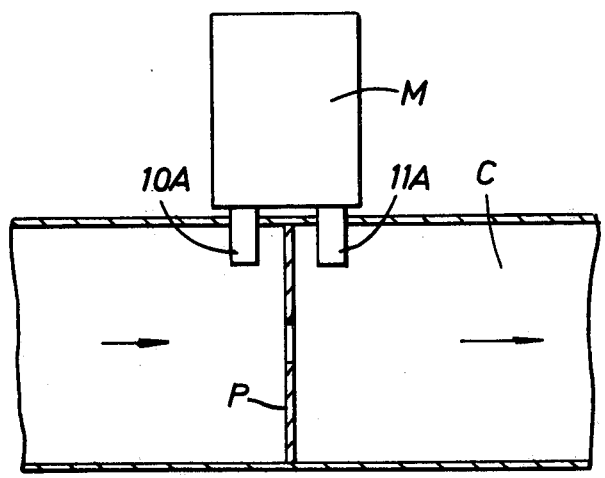
FIG. 5 illustrates fluid flow-metering apparatus embodying the first and fourth aspects of the invention.

As indicated before, tests have also shown that the rate of rotation of the rotor 9 is substantially proportional to the square root of the fluid pressure difference across the flowmeter device over a very wide range of flowrates, and accordingly it is possible to employ the illustrated flowmeter device in parallel with an orifice plate or similar restricting device thereby to measure flowrates greatly in excess of that which can actually flow through the flowmeter device. In a typical arrangement of this type, illustrated in FIG. 5, a flowmeter device M (identical to the flowmeter device of FIGS. 1 to 4) is arranged so that its inlet and outlet ports 10 and 11 communicate with a conduit C, in which there is arranged an orifice plate P, with the inlet port 10 upstream of orifice plate P and with the outlet port 11 downstream of plate P. This results in a pressure difference, due to fluid flow along conduit C, between the inlet and outlet ports 10 and 11, such that a minor proportion of the fluid flowing along conduit C flows into and out of chamber 4 through ports 10 and 11, while a major proportion of the fluid flowing along conduit C bypasses the chamber 4, the ratio between said minor and major proportions being substantially fixed over a range of rates of flow of a given fluid along conduit C, of 60:1 (i.e. the maximum rate of flow being 60 times the minimum rate) or more.

In another typical arrangement not shown, an orifice plate unit is interposed in a conduit conveying the fluid of which the flow is to be metered, the orifice plate unit having an adaptor into which the flowmeter device can be inserted so that inlet conduit 10A is in communication with the interior of the main conduit upstream of the orifice plate and outlet conduit 11A is in communicated with the interior of the main conduit downstream of the orifice plate.

In this condition, if Q is the total rate of fluid flow through the orifice plate and flowmeter, $q_1$ is the rate of fluid flow through the flowmeter device and $q_2$ is the rate of fluid flow through the orifice plate, then over the appropriate range of flowrates the rate of rotation of the rotor 9 is directly proportional not only to $q_1$ but also to $Q$ ($=q_1+q_2$), where $q_2>>q_1$.

Preferably, the adaptor is so configured that the flowmeter device can be rotated as a whole into a position in which its inlet and outlet conduits are out of communication with the interior of the main conduit, thereby permitting the flowmeter device to be dismantled or entirely removed without the need of shutting off the flow through the main conduit.

In a modification, casing element 1 is made of stainless steel instead of plastics. In this case it is better to make members 1' separately from the 1' of casing element 1, and to make them with a P.T.F.E. coating.

We claim:
1. A fluid flowmeter device comprising a casing defining a cylindrical chamber, a first end wall closing one end of said chamber, an inlet and an outlet for the fluid in said first end wall, a separately made ring of metal fitted non-rotatably in said chamber, two bearings at diametrically opposite positions in said ring, said ring having a cylindrical outer face and a cylindrical inner face and two diametrically opposite bores, the bearings being received within said bores, the cylindrical outer faces of said ring fitting in said cylindrical chamber, a rotor mounted on said bearings so that the rotor axis is perpendicular to and intersects the axis of said ring, said rotor including radially directed axially-extending blades which are each substantially rectangular as seen in a direction perpendicular to the respective blade, one or more inductively detectable elements mounted in the tip or tips of one or more respective blades of the rotor, and two or more members made separately from said ring and partly filling the interior of said ring, each of said two or more members having a part-cylindrical outer face interfitting with a respective part of the cylindrical inner face of said ring, and a planar inner face facing the rotor and perpendicular to the axis of the rotor, a second end wall closing the other end of the chamber, a coil arranged in the vicinity of the second end wall, means sealing off the coil fluid-tightly from the chamber, said coil being adapted and arranged for sensing rotation of the rotor by sensing passage past the vicinity of the coil of said elements.

2. A fluid flowmeter as claimed in claim 1 wherein the casing encases an electrical circuit electrically connected to said coil and fluid-tightly sealed off from said chamber and adapted to produce an electrical output signal indicative of fluid flow.

3. Fluid flow-metering apparatus comprising a fluid flowmeter device and a conduit, wherein said flowmeter device comprises a casing defining a cylindrical chamber, a first end wall closing one end of said chamber, and inlet and an outlet for the fluid in said first end wall, a separately made ring of metal fitted non-rotatably in said chamber, two bearings at diametrically opposite positions in said ring, said ring having a cylindrical outer face and a cylindrical inner face and two diametrically opposite bores, the bearings being received within said bores, the cylindrical outer faces of said ring fitting in said cylindrical chamber, a rotor mounted on said bearings so that rotor axis is perpendicular to an intersects the axis of said ring, said rotor including radially-directed, axially-extending blades which are each substantially rectangular as seen in a direction perpendicular to the respective blade, one or more inductively detectable elements mounted in the tip or tips of one or more respective blades of the rotor, and two or more members made separately from said ring and partly filling the interior of said ring, each of said two or more members having a part-cylindrical outer face interfitting with a respective part of the cylindrical inner face of said ring, and a planar inner face facing the rotor and perpendicular to the axis of the rotor, a second end wall closing the other end of the chamber, a coil arranged in the vicinity of the second end wall, means sealing off the coil fluid-tightly from the chamber, said coil being adapted and arranged for sensing rotation of the rotor by sensing passage past the vicinity of the coil of said elements, and wherein said inlet and said outlet communicates with said conduit, the flowmeter device being adapted to produce a pressure difference due to fluid flow along said conduit between said inlet and said outlet such that a minor proportion of the fluid flowing along said conduit flows into and out of said chamber though said inlet and outlet while a major proportion of the fluid flowing along sid conduit bypasses said chamber, the ratio between said minor and major proportions being substantially fixed over a range of rates of flow of a given fluid along said conduit.

4. Apparatus as claimed in claim 3 wherein an orifice plate is arranged in said conduit so that said inlet is upstream and said outlet downstream of the orifice plate.

* * * * *